W. R. WILSON.
ROLLER BEARING HUB.
APPLICATION FILED JUNE 5, 1920.
1,379,670.
Patented May 31, 1921.
2 SHEETS—SHEET 1.
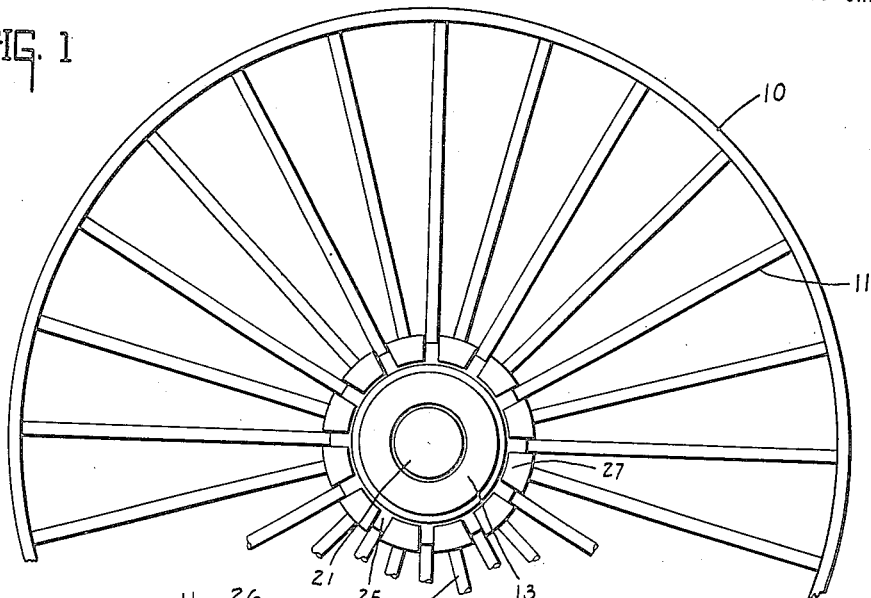
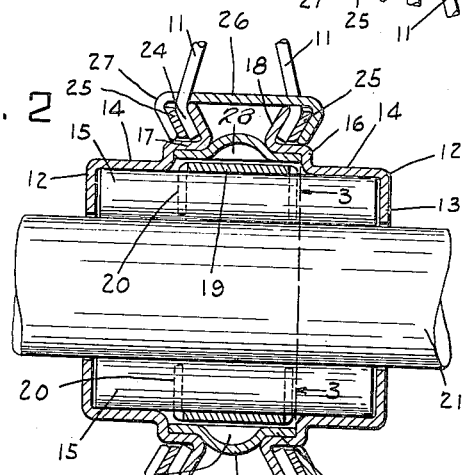
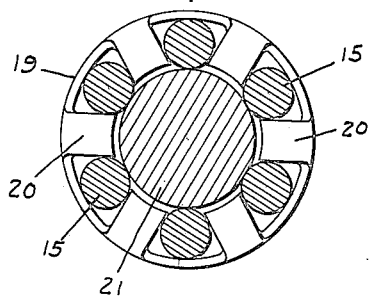
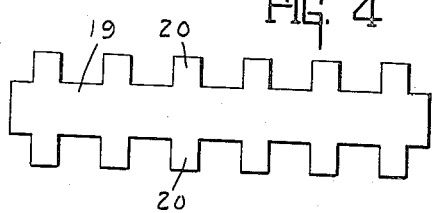
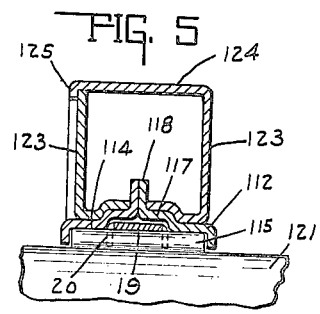
INVENTOR.
WILLIAM R. WILSON.
BY
ATTORNEYS W. R. WILSON.
ROLLER BEARING HUB.
APPLICATION FILED JUNE 5, 1920.
1,379,670.
Patented May 31, 1921.
2 SHEETS—SHEET 2.
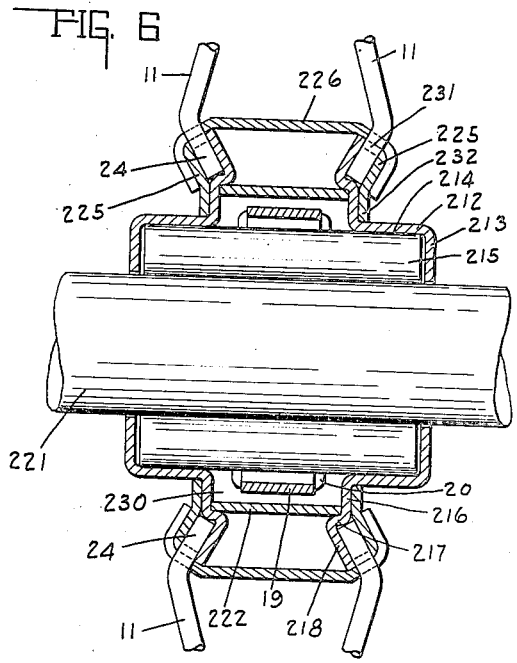
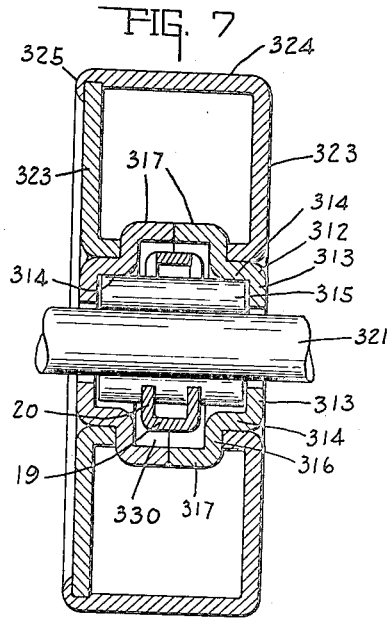
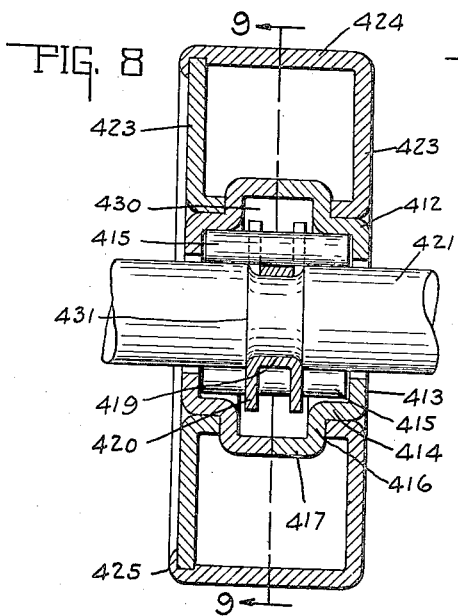
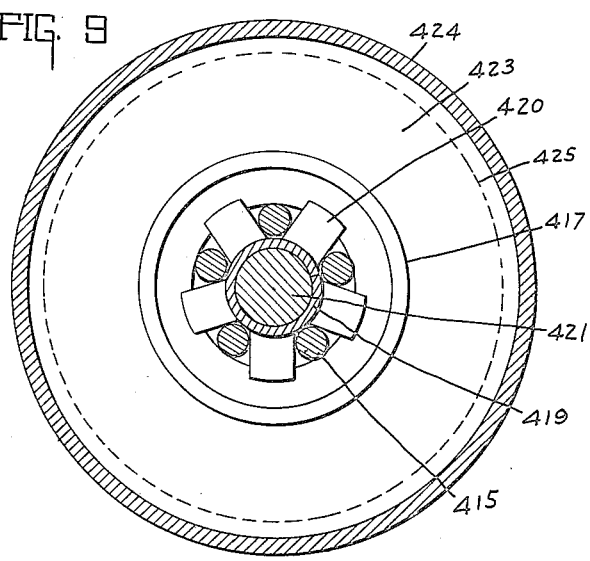
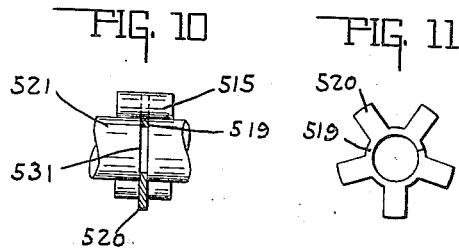
INVENTOR.
WILLIAM R. WILSON.
BY
ATTORNEYS.

UNITED STATES PATENT OFFICE.

WILLIAM R. WILSON, OF TERRE HAUTE, INDIANA.

ROLLER-BEARING HUB.

1,379,670.

Specification of Letters Patent.

Patented May 31, 1921.

Application filed June 5, 1920. Serial No. 386,698.

*To all whom it may concern:*

Be it known that I, WILLIAM R. WILSON, a citizen of the United States, and a resident of Terre Haute, county of Vigo, and State of Indiana, have invented a certain new and useful Roller-Bearing Hub; and I do hereby declare that the following is a full, clear, and exact description thereof, reference being had to the accompanying drawings, in which like numerals refer to like parts.

This invention relates to roller bearing hubs and the like, and the chief object of the invention is to construct a hub in an improved manner and provide the same with roller bearings and means for spacing said roller bearings within said hub and retaining the same within said hub.

The chief feature of the invention consists in forming the spacing and retaining means of a single strip, which is formed into the completed spacing and retaining ring.

A further feature of the invention is the provision of means associated with the hub construction when the latter is applied to a spoked wheel, which not only secures said hub construction in assembled relation, but also secures the spokes to said hub construction and spaces the same simultaneously therewith.

Another feature of the invention is the positioning of the retaining ring in the center of the hub construction, and so forming said ring such that the rollers associated with said hub construction extend throughout substantially the entire width of the hub, being prevented by said ring from dropping from said hub, yet being free of said ring when outward pressure is exerted upon the rollers.

Another feature of the invention consists in providing simple means for lubricating the rollers.

An additional feature of the invention consists in the lubrication of the elongated rollers, in some instances by the retaining ring acting as an oil ring when the simple lubricating means hereinbefore mentioned is not provided, or even when the same is provided.

A further feature of the invention is the divided construction of the hub, whereby hubs of various lengths may be constructed of standard hub-forming ends and retaining means, and with rollers and spacing members of the desired length.

Another feature of the invention is the provision of spacing means for the spokes in addition to the securing and spacing means hereinbefore mentioned, whereby the spokes may be positioned in spaced relation until the same are secured in assembled relation.

The full nature of the invention will be understood from the accompanying drawings and the following description and claims.

In the drawings, Figure 1 is a side elevational view of the invention applied to a spoked wheel. Fig. 2 is a central sectional view of the invention shown in Fig. 1. Fig. 3 is a transverse cross sectional view taken on the line 3—3 of Fig. 2. Fig. 4 is a developed view of the retaining ring. Fig. 5 shows the invention applied to another form of wheel. Fig. 6 is a longitudinal sectional view of a modified form of the invention, certain features of the invention shown in Fig. 2 being omitted. Fig. 7 is a longitudinal sectional view of a modified form of the invention illustrated in Fig. 5. Fig. 8 is a longitudinal sectional view of a modified form of the invention showing a reversed form of the retaining ring. Fig. 9 is a cross sectional view taken on line 9—9 of Fig. 8. Fig. 10 is an elevational view of another modified form of the invention showing the same applied to a hub of narrow length. Fig. 11 is a side view of a modification shown in Fig. 10.

In the drawings 10 indicates the felly of a spoked wheel provided with spokes 11, said spokes extending radially inward toward the hub and being secured thereto. In Fig. 2 the invention is clearly shown and comprises two substantially similar hub plates, disks or caps 12, said plates each comprising a radial flanged portion 13, and a circumferential bearing portion 14 providing a bearing surface for the elongated rollers 15, said flange 13 forming the end retaining member of the hub. The hub plate 12 at its inner end adjacent the bearing portion 14 is provided with an outwardly extending portion 16 and a cylindrical circumferential portion 17, said portions 16 and 17 forming a groove or channel for a purpose hereinafter to be described. Adjacent the groove forming portion 17 is an outwardly and angularly extending portion 18.

As shown clearly in Figs. 2, 3 and 4, the rollers 15 are secured in spaced relation in the hub 12 by means of the spacing ring 19, said ring, as shown in Fig. 4, being formed from an elongated flat strip provided with sidewardly extending projections 20, said projections being secured in spaced relation to said strip. The opposite projections 20 are bent at right angles to the main portion of the strip 19 and are adapted to lie substantially parallel to each other, as shown clearly by the dotted lines in Fig. 2. The projections 20 are so formed that when bent, as shown, and when the strip 19 also is bent into circular form, see Fig. 3, said projections extend radially inward and lie in substantially two parallel planes. The projections 20 or fingers are of such dimensions that the space between adjacent edges of the adjacent fingers increases from the free ends of said fingers toward the supported or outer ends thereof, see Fig. 3. When thus proportioned and positioned, said fingers prevent the rollers from dropping through between said fingers and out of said hub bearing, yet said rollers when associated with said hub and shaft or axle 21 do not engage or bear upon the ring body portion 19, but, instead, bear upon the bearing portions 14 of the hub cap or plates 12. Thus the retaining ring merely retains the rollers within the hub when the axle or shaft 21 is removed therefrom and secures said rollers in spaced relation within said hub without being subjected to any of the stresses of said bearing or hub construction.

The retaining member 19 is loosely positioned within the hub construction by being seatable in the groove formed by the portions 16 and 17 of said hub plates, see Fig. 2. In the present construction, the hub plates 12 are spaced from each other by means of a spacing ring 22, said ring being provided with an annular groove 23 adapted to receive and retain lubricant, such as oil and the like. The annular groove portion 23 provides an abutment against which the flange portion 18 is adapted to rest. The annular groove formed by the flange portions 16 and 17 of said hub plates is of sufficient depth to receive the retaining ring 19 as well as the spacing and lubricating ring 22.

The hub caps 12 are secured together and the spokes are secured thereto by the following means: Each of the spokes 11 terminates adjacent the hub cap, alternate spokes being positioned upon the same hub cap. The spokes each have an augular end portion 24 seatable in the groove formed by the angular projecting portion 18 and the circumferential portion 17. A conical washer or retaining ring 25 is positioned adjacent each series of angular ends 24, so that when pressure is applied to said ring, the ends 24 will be rigidly clamped between the retaining ring 25 and the angular flange 18. Suitable means may be provided for clamping said end plates 12 together and additional means may be provided for clamping the washers 25 together, but in the present instance a single means is provided which accomplishes both of these functions and in addition spaces said spokes as well. This means comprises a cylindrically-shaped ring 26 provided with outwardly extending projections 27 upon each of the circular edges thereof. The projections upon one side of said ring are in staggered relation with the projections upon the other side of said ring, see Figs. 1 and 2.

The hub is assembled as follows: One of said plates 12 is provided with the spacing and lubricating member or ring 22, and within the same is positioned the spacing and retainig ring 19 provided with the required number of rollers. The other hub plate 12 is then positioned upon said rollers and spacing ring 22 and the spokes 11 are positioned in the grooves formed by the angular flanges 18; the washers 25 are then positioned adjacent said spokes and the projections 27 on the spacing and securing and clamping ring 26 are turned inwardly and angularly by suitable means so as to engage the washer 25 or clamping ring to clamp the spokes to the hub in spaced relation and to secure the divided hub in assembled relation.

To insure the distribution of the lubricant, the annular groove 23 is provided with means such as a pair of ridges 28 which carries the oil upwardly and spills the same upon the rollers 15 and the shaft 21.

In Fig. 5 the invention is shown applied to a smaller wheel, which in the present instance is formed of metal throughout and is not provided with spokes. In these embodiments of the invention the width of the hub is such that the spacing ring 22 provided in the previously described embodiment of the invention is omitted, and in this instance the lubricating means is also omitted. This embodiment of the invention consists of a pair of substantially similar hub plates 112 adapted to receive a plurality of elongated rollers 115 and a shaft or axle 121. The hub plates 112 are provided with a circumferential portion 117 which is offset from the body portion of the hub plate or bearing portion 114 to provide the centrally positioned groove adapted to receive the retaining ring 19 provided with the inwardly and radially extending fingers 20. In the present construction the hub plates are provided with outwardly and circumferentially extending flange portions 118 which are adapted to abut each other and form seats for the wall portions 123, which in the present instance are shown such that one of said wall portions is bent to form the outer circumferential bearing portion or felly rim 124 of the wheel. The bearing portion 124 is provided, adjacent the other wall portion 123, with an inwardly turned engaging flange portion 125 adapted to grip and maintain all of said wheel construction in assembled relation and under tension. Thus, in Fig. 5, the rollers 115 bear upon the shaft or axle 121 and also bear upon the bearing portion 114 of the hub caps 112, said hub caps providing an annular channel midway between the ends of said hub construction to receive the spacing and retaining ring 19. The hub caps are thus secured together in assembled relation as described.

While the preferred form of the invention is illustrated in Figs. 1, 2, 3 and 4, the same may be modified as shown in Fig. 6. In this figure the spokes 11 are provided with the same angularly positioned end portions 24. Each of the hub end forming means, caps, or plates 212 is provided with an inwardly extending angular flange 213 and a cylindrical bearing portion 214 intermediate between said end flange and the outwardly projecting portion 216. The portions 216 are provided with two cylindrical circumferential portions 217, said portions 216 and 217 of the hub caps or plates forming a seat to receive a cylindrical casing, sleeve or spacing member 222, whereby a channel 230 is formed in the hub at the center thereof. In this modification, the shaft 221 supports the hub construction by means of the elongated rollers 215 which bear upon the circumferential bearing portions 214 of the hub construction. The rollers 215 are retained in spaced relation with respect to each other and are retained within said hub when the axle or shaft 221 is removed therefrom by the spacing and retaining ring 19 provided with the inwardly and radially extending fingers or spacing portions 20, said ring being similar to that shown in detail in Figs. 3 and 4. From the foregoing construction it will be understood that the ring 19 revolves within the hub and in the channel 230, whereby said ring when said channel is filled with lubricant, will act as an oil ring by carrying oil upwardly and spilling the same upon the rollers.

Fig. 6 shows a further modification of the invention from that shown in Fig. 2. In this instance the hub plate is provided with an angularly and outwardly extending flange portion 218 against which the spokes 11 bear. Preferably the washer means 225, which is positioned adjacent the flange means 218, bears upon the spokes and is provided with angularly and inwardly extending spacing members, projections or means 231, which spaces said spokes 11 during the assembling of said hub.

Although the spacing means 231 is preferably shown integral with the washer means 225, said projections may be formed upon the angularly extending flange portion 218 without departing from this feature of the invention. The washer means 225 is provided with a plate portion 232, which in this instance is adapted to bear against the outwardly and radially extending flange portion 216 of the groove-forming portion of said hub, while the inner end of said washer is adapted to bear against the cylindrical bearing portion 214 of said hub. With the construction described, the spacing ring member 226 may be eliminated and suitable clamping means substituted therefor, which will simultaneously clamp the washer means 225, the hub caps, spokes and spacing ring 222 in assembled relation. With this construction the spokes may be positioned in spaced relation with respect to each other by means of the washer means and projections thereon, and the same may be locked in spaced relation by means of the ring or other suitable means 226, but preferably the ring shown in Figs. 1 and 2 is used such that the spacing and projecting portions 231 and the spaced clamping portions 27 coöperate with each other to rigidly clamp said spokes in spaced relation, as well as secure the hub construction in assembled relation.

In Fig. 7 the modified form of the invention illustrates the feature hereinbefore described of the retaining ring acting as an oil ring. In this construction the parts are similarly numbered, the hub plates being indicated by the numerals 312, the inwardly extending flange means 313, the cylindrical bearing portion 314, the outwardly and radially extending groove-forming flange 316 and the cylindrical sleeve groove-forming means 317. In this instance the shaft or axle is indicated by the numeral 321 and the elongated rollers by the numerals 315. The spacing and retaining ring in this instance is indicated by the numerals 19 and the radially extending spacing projections by the numerals 20. The hub-forming means hereinbefore described is secured together in assembled relation by means of the side members 323, one of which is preferably provided with a cylindrical roller bearing surface 324 and an overhanging flange portion 325 by which all of said means are secured in assembled relation.

In Fig. 8 another modified form of the invention is shown, and this modification may be applied with equal facility to the modifications illustrated in Figs. 1 to 7 inclusive without departing from the broader features of this invention. In this instance the shaft or axle is indicated by the numerals 421, the elongated rollers by the numerals 415, the hub-forming caps or ends by the numerals 412, the longitudinal flange retaining means 413, the cylindrical bearing portion 414, the radially and outwardly extending groove-forming flange 416 and the cylindrical sleeve groove-forming portion 417. In this embodiment the side portions are indicated by the numerals 423, the cylindrical bearing portion by the numerals 424 and the securing flange portion by the numerals 425. The hub construction includes the groove 430 in which a modified form of retaining and spacing ring is positioned. The shaft 421 is provided with a groove 431 in which the ring body portion 419 is seatable and freely rotatable therein. In this modification of the retaining ring, the spacing and retaining projecting portions 420 extend radially of said ring, but instead of extending inwardly from the ring, they extend outwardly from the ring. With this modification of the invention the ring is split as shown in Fig. 9, and is slipped on the shaft 421 until it is seatable in the groove or slot 431 in said shaft, whereupon said ring snaps into place and into circular form. With this construction of the ring the rollers are supported by the retaining ring when the shaft or axle 421 is withdrawn or removed from the hub construction, yet the outward movement of said rollers when said shaft is inserted into said hub construction, is limited by the cylindrical bearing portion 414 of the hub construction. In this construction the ring also acts as an oil ring and the same may be applied with equal facility to the forms of the invention illustrated in Figs. 1 to 7 inclusive without departing from the broader features of the invention. In Figs. 10 and 11 is illustrated a modified form of the invention which is similar to the construction shown in Figs. 8 and 9. Heretofore the retaining ring has been described as provided with a plurality of spacing projections 420 which coöperate with each other and the same roller. In this instance the ring 519 consists of a single stamping and is provided with a plurality of radially and outwardly extending spacing projections 520. This construction of the spacing ring is used where the width of the hub construction is very small, or said hub is very narrow such that the dual or parallel construction shown in Figs. 1 to 9 inclusive would not be satisfactory. It will also be understood that instead of said projections extending radially and outwardly from the ring 519, which is seatable in the slot 531 formed in the shaft 521, whereby the rollers 515 are retained in spaced relation, said projections may extend radially and inwardly from said ring and said ring be positioned in the groove formed in the manner hereinbefore described.

Heretofore in constructions, the elongated rollers have been secured in spaced relation by means of the ends thereof being secured to suitable rings and loosely positioned therein, one form of which is shown in the Patent No. 1,340,693. With the present invention a mechanism is provided whereby the rollers coöperate with the shaft and the hub-forming means. With this construction, skewing of the roller as the same rotates with the hub does not interfere with the successful operation of the roller, or cause undue wear. In prior devices the rollers have been retained in many ways. Heretofore as the roller was rotated about the axle, theoretically the axis of said roller was rotated about the axis of said shaft and was always parallel to the same. Even with the great care, however, in machining the respective parts, inequalities will exist such that as the roller rotates in the hub construction at one point thereof, said axis becomes skewed to the axis of the shaft, causing a slipping movement rather than a rolling movement which introduces undue stress upon the retaining means, spacing means and the hub means. With this construction said rollers are free to rotate about the shaft axis and there is no stress transmitted to the retaining means through the skewing of the rollers.

While the invention has been described in great detail, it will be understood that many modifications thereof will suggest themselves to those skilled in the art, some of which have been described in the preceding specification; and these modifications are considered to be within the broad purview of this invention.

The broad feature of the invention consists of a hub construction adapted to contain a plurality of elongated rollers, said rollers bearing upon a shaft or axle and being held in spaced relation within said hub construction and being retained within said hub construction when the shaft is removed therefrom by retaining ring means. When an outward thrust is exerted upon the rollers by said shaft being inserted, said thrust is borne by the hub bearing portions between which is positioned the retaining ring means. The other features of the invention include the split hub construction and the lubrication for said rollers.

The invention claimed is:

1. A hub construction comprising hub-forming means provided with inwardly extending flange means at the ends of the hub, a plurality of elongated rollers in said hub-forming means, the inwardly extending flange means limiting the longitudinal movement of said rollers in said hub construction, said hub-forming means intermediate the ends of said hub construction forming an annular groove and two adjacent roller bearing surfaces, a spacing means seatable in said annular groove between said roller bearing surfaces, said spacing means securing said rollers in spaced relation within said hub construction.

2. A hub construction comprising hub-forming means provided with inwardly extending means at the ends of the hub, a plurality of elongated rollers in said hub-forming means, the inwardly extending means limiting the longitudinal movement of said rollers in said hub construction, said hub-forming means forming a pair of cylindrical roller bearing surfaces adjacent said inwardly extending means, and a spacing ring positioned intermediate the ends of said hub construction and provided with radially extending projections for separating and spacing said rollers within said hub construction, said rollers being limited by said ring from inward movement toward the axis of said hub construction, said rollers being limited in outward movement from the axis of said hub construction by the cylindrical hub bearing surfaces.

3. A hub construction comprising hub-forming means provided with radial means, a plurality of elongated rollers in said hub-forming means, said radial means limiting the longitudinal movement of said rollers in said hub construction, said hub-forming means providing a cylindrical roller bearing surface at each end of the hub construction, and a retaining and spacing ring positioned intermediate the bearing surfaces and provided with radial projections extending between the rollers, said ring limiting the inward movement of said rollers toward the hub axis and said cylindrical bearing surfaces limiting the outward movement of said rollers away from the hub axis.

4. A hub construction comprising hub-forming means provided with radial means, a plurality of elongated rollers in said hub-forming means, the radial means limiting the longitudinal movement of said rollers in said hub construction, said hub-forming means providing a cylindrical roller bearing surface at each end of the hub construction and a groove intermediate the same, and a retaining and spacing ring positioned with respect too said groove and provided with radial projections extending between said rollers, said ring limiting the inward movement of said rollers toward the hub axis and said cylindrical bearing surfaces limiting the outward movement of said rollers away from said hub axis.

5. A hub construction comprising hub-forming means provided with radial means, a plurality of elongated rollers in said hub-forming means, the radial means limiting the longitudinal movement of said rollers in said hub construction, said hub-forming means providing a cylindrical roller bearing surface at each end of the hub construction and an intermediate groove, a retaining and spacing ring positioned intermediate the bearing surfaces and provided with radial projections extending between said rollers, said ring limiting the inward movement of said rollers toward the hub axis and said cylindrical bearing surfaces limiting the outward movement of said rollers away from said hub axis, and lubricating means positioned in said intermediate groove for lubricating the rollers.

6. A hub construction comprising a pair of similar hub-forming members provided with radial means, a plurality of elongated rollers in said hub-forming members, the radial means of each member limiting the longitudinal movement of said rollers in said hub construction, said hub-forming members providing an annular portion to form a central groove in the hub construction, and a cylindrical bearing surface on both sides of said groove, a retaining and spacing ring seatable in said groove provided with radial projections seatable between said rollers, said radial projections limiting the inward movement of said rollers toward the hub axis and said cylindrical bearing surfaces limiting the outward movement of said rollers away from the hub axis, and means securing said hub-forming members together.

7. In a hub construction for a spoked wheel,, the combination of a pair of hub-forming members, each provided with radial means, a plurality of elongated rollers in said hub forming members, the radial means limiting the longitudinal movement of said rollers in said hub construction, each hub-forming member providing a cylindrical roller bearing surface adjacent the inwardly extending radial means, and an outwardly extending portion, said outwardly extending portions being positioned adjacent each other, a retaining and spacing ring positioned intermediate the bearing surfaces and provided with radial projections extending between said rollers, said ring limiting the inward movement of said rollers toward the hub axis and said cylindrical bearing surfaces limiting the outward movement of said rollers away from said hub axis, and means being adapted to be associated with the wheel spokes and said outwardly extending portions of said hub-forming members for clamping the wheel spokes and said members in assembled relation.

8. In a hub construction for a spoked wheel, the combination of a pair of hub-forming members, each provided with radial means, a plurality of elongated rollers in said hub forming members, the radial means limiting the longitudinal movement of said rollers in said hub construction, each hub-forming member providing a cylindrical roller bearing surface adjacent the radial means and an outwardly extending portion, said outwardly extending portion being positioned adjacent each other, a retaining and spacing ring positioned intermediate the bearing surfaces and provided with radial projections extending between said rollers, said ring limiting the inward movement of said rollers toward the hub axis and said cylindrical bearing surfaces limiting the outward movement of said rollers away from said hub axis, and means being adapted to secure the wheel spokes in spaced relation with each other and to said hub-forming members and for securing said hub-forming members in assembled relation.

9. In a hub construction for a spoked wheel, the combination of a pair of hub-forming members, each provided with radial means, a plurality of elongated rollers in said hub-forming members, the radial means limiting the longitudinal movement of said rollers in said hub construction, each hub-forming member providing a cylindrical roller bearing surface adjacent the radial means and an outwardly extending portion, said outwardly extending portion being positioned adjacent each other, a retaining and spacing ring positioned intermediate the bearing surfaces and provided with radial projections extending between said rollers, said ring limiting the inward movement of said rollers toward the hub axis and said cylindrical bearing surfaces limiting the outward movement of said rollers away from said hub axis, washer means positioned adjacent each outwardly extending portion of said hub-forming members, alternate spokes being associated with the same washer means and the same hub member, and a single means associated with said spokes for spacing the same about said hub members and simultaneously securing said spokes to said hub members and said hub member to each other.

10. A retaining and spacing ring for a roller bearing hub construction including a strip of metal provided with sideward projections, said strip being bent and secured in circular form, the projections being bent angularly thereto so as to extend radially from said circular strip body portion.

In witness whereof I have hereunto affixed my signature.

WILLIAM R. WILSON.